(12) United States Patent
Khan et al.

(10) Patent No.: US 12,556,604 B2
(45) Date of Patent: Feb. 17, 2026

(54) SYSTEMS AND METHODS FOR LOW-LATENCY BLOCKCHAIN PROCESSING

(71) Applicant: Verizon Patent and Licensing Inc., Basking Ridge, NJ (US)

(72) Inventors: Ahmed A. Khan, Plano, TX (US); Mohammed Alsadi, Redmond, WA (US); Sammy Alnajar, Plano, TX (US); Salman Ali Danish Mohammed, Wylie, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/639,429

(22) Filed: Apr. 18, 2024

(65) Prior Publication Data

US 2025/0330518 A1 Oct. 23, 2025

(51) Int. Cl.
*H04L 67/1095* (2022.01)
*H04L 67/1097* (2022.01)

(52) U.S. Cl.
CPC ...... *H04L 67/1095* (2013.01); *H04L 67/1097* (2013.01)

(58) Field of Classification Search
CPC .......... H04L 67/1095; H04L 67/1097
USPC .................................................. 709/217
See application file for complete search history.

(56) References Cited

U.S. PATENT DOCUMENTS

| 12,306,722 | B2* | 5/2025 | Arumugam | H04L 9/50 |
| 2020/0119910 | A1* | 4/2020 | Ojha | G06F 16/2465 |
| 2021/0312438 | A1* | 10/2021 | Li | G06Q 20/3827 |

\* cited by examiner

*Primary Examiner* — John A Follansbee

(57) ABSTRACT

A system described herein may maintain a local copy of a blockchain that is associated with a blockchain network, receive a first request to perform a blockchain operation with respect to the blockchain, perform the requested blockchain operation with respect to the local copy of the blockchain to generate a first result, and output the first result in response to the first request. The system may output a second request to the blockchain network to perform the blockchain operation, receive a second result from the blockchain network in response to the second request, wherein the second result is generated by the blockchain network based on the blockchain network performing the blockchain operation with respect to the blockchain, wherein the second result is received from the blockchain network after outputting the first result in response to the first request, and maintain information indicating whether the first result matches the second result.

20 Claims, 12 Drawing Sheets

SYSTEMS AND METHODS FOR LOW-LATENCY BLOCKCHAIN PROCESSING

BACKGROUND

Blockchains provide for the decentralized and secure storage of data, decentralized computing, or other technical operations. Blockchains may further provide for the immutability of recorded data (e.g., as maintained by computing devices that implement nodes), as data may not be altered once recorded to a blockchain. Blockchains may be maintained by multiple nodes, such as geographically distributed or otherwise distinct servers, workstations, etc., that each maintain local copies of respective blockchains, perform computing operations based on information (e.g., executable code, instructions, variables, etc.) recorded to respective blockchains, and/or perform other operations.

DETAILED DESCRIPTION OF EXAMPLE EMBODIMENTS

The following detailed description refers to the accompanying drawings. The same reference numbers in different drawings may identify the same or similar elements.

Blockchains may be maintained by multiple nodes, such as geographically distributed or otherwise distinct servers, workstations, etc., that each maintain local copies of respective blockchains. A blockchain network may refer to a particular group of nodes that communicate with each other to maintain a particular blockchain, which may include participating in consensus mechanisms to validate records added to the blockchain, prior to the confirmation or addition of such records to the blockchain. This consensus mechanism may facilitate the decentralized nature of the blockchain, inasmuch as records are not able to be added to the blockchain without validation, verification, approval, etc. from at least a threshold quantity of the nodes (e.g., a "quorum").

The consensus mechanism may include performing computations, such as executing chaincode (e.g., instructions, code, etc. maintained on the blockchain) or other suitable computations or operations, by at least the threshold quantity of nodes. Such computations may be based on input data provided by a client device or other entity seeking to add a record to the blockchain, and may yield one or more outputs, results, etc. as a result of performing the requested computations on the provided set of input. Performing blockchain operations (e.g., results of computations such as the execution of chaincode) by multiple nodes of a blockchain network, as well as achieving consensus for such operations, may take a measurable amount of time (e.g., seconds, minutes, or hours). Embodiments described herein provide for a faster execution of the performance of blockchain operations (e.g., execution of chaincode), thus enhancing the operation of the blockchain network and providing a faster user experience for users or other entities that request the performance of such operations.

Figure 1:
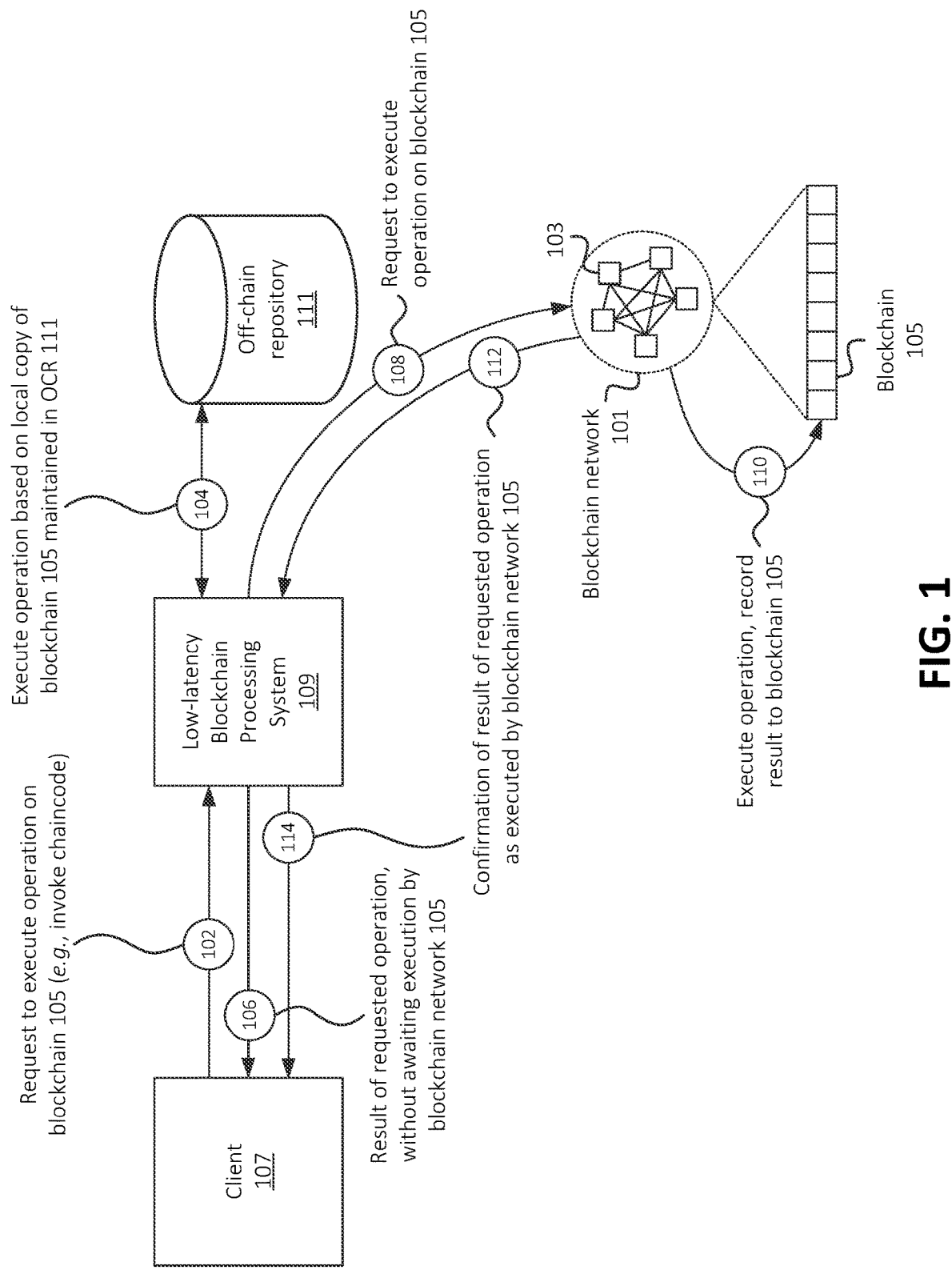
FIG. 1 illustrates an example overview of one or more embodiments described herein.

As shown in FIG. 1, for example, a particular blockchain network 101 may include a set of nodes 103 that maintain a particular blockchain 105. Nodes 103 may, for example, execute chaincode (e.g., based on requests from an authorized entity), participate in a consensus mechanism to record new information (e.g., blocks) to blockchain 105, provide "read" access to blockchain 105, and/or may perform other suitable operations. In accordance with some embodiments, blockchain 105 may be accessible to one or more entities, such as client device 107, Low-latency Blockchain Processing System ("LBPS") 109, and/or some other suitable device or system. For example, in some embodiments, blockchain network 101, one or more nodes 103 thereof, and/or blockchain 105 may be publicly accessible (e.g., without any authentication or authorization mechanisms restricting access). On the other hand, in some embodiments, blockchain network 101, one or more nodes 103 thereof, and/or blockchain 105 may be private or "permissioned," in which only authorized and/or authenticated entities may access blockchain 105 (e.g., read the contents of blockchain 105, submit requests to invoke chaincode and/or to write new blocks to blockchain 105, etc.).

As discussed herein, LBPS 109 may provide for a mechanism by which the results of performing blockchain operations on blockchain 105 may be obtained instantly or otherwise with relatively low latency or delay (e.g., relative to how much time it may take for blockchain network 101 to provide such results). For example, as shown, client device 107 may output (at 102) a request to execute an operation on blockchain 105, such as invoking particular chaincode that is present on blockchain 105, writing a new block to blockchain 105, etc. The request (at 102) may specify the particular operations to perform, which may include invoking a name or identifier of particular chaincode, providing one or more addresses (e.g., specifying one or more particular blocks) on blockchain 105 that include particular chaincode, or the like. The request may further specify a set of input parameters, such as values, variables, or the like. In some situations, the input parameters may include references to values stored on blockchain 105, such as variable names or identifiers, and/or addresses of blocks on blockchain 105 at which such input parameters are maintained.

Client device 107 may communicate with LBPS 109 via a particular application programming interface ("API") or some other suitable communication pathway. In some embodiments, some or all of the operations described herein with respect to LBPS 109 may be performed by one or more nodes 103 of blockchain network 101. In some embodiments, some or all of the operations described below with respect to node 103 may be performed by LBPS 109. For example, in some embodiments, LBPS 109 and a given node 103 may be implemented by the same device or system. On the other hand, in some embodiments, LBPS 109 and nodes 103 may be implemented by discrete devices or systems that communicate via a network, an API, or some other suitable type of interface.

As discussed below, LBPS 109 may maintain a local copy of some or all of the contents of blockchain 105. In some embodiments, LBPS 109 may maintain such local copy and/or other suitable information in off-chain repository 111, which may be or may be implemented by a database, a datacenter, or some other suitable type of information storage apparatus or mechanism. In some embodiments, some or all of OCR 111 may include or may be implemented by a blockchain network (e.g., which may be separate and distinct from blockchain network 101).

In some embodiments, LBPS 109 may implement the same APIs, frameworks, software development kits ("SDKs"), etc. that are implemented by nodes 103 of blockchain network 101. In this manner, LBPS 109 may be able to perform the same operations on blockchain 105 as nodes 103 are able to perform.

LBPS 109 may execute (at 104) the requested operation, based on the local copy of blockchain 105 as maintained in OCR 111. For example, LBPS 109 may identify particular chaincode in the local copy of blockchain 105 (e.g., as maintained in OCR 111) that was specified in the request. Further, LBPS 109 may identify one or more value specified in the request from client device 107, where such values may be indicated as inputs for the requested operation. LBPS 109 may perform the requested operation (e.g., execute chaincode specified in the request), and may generate a result based on the requested operation (e.g., where the result may include one or more output values generated based on performing the requested operation on the input values). The result may be or may include one or more values, strings, parameters, etc.

In some embodiments, the result may be, may include, may be represented by, and/or may otherwise be associated with a hash value (referred to herein as "result hash"). For example, LBPS 109 may perform a cryptographic hashing operation to generate the result hash, where such cryptographic hashing operation is performed on values associated with the request, the operation performed based on the request, and/or the generated output based on performing the operation. For example, the result hash may be generated based on one or more identifiers, addresses, blocks, etc. associated with chaincode that was invoked by the request. Additionally, or alternatively, the result hash may be generated based on some or all of the input values provided in the request. Additionally, or alternatively, the result hash may be generated based on some or all of the output values generated based on performing the requested operation. In this sense, the result hash may represent the result generated based on the request, and/or the request itself.

LBPS 109 may output (at 106) the result of the requested operation to client device 107, which may include providing one or more output values generated based on performing the requested operation, the result hash, and/or other suitable information. In this manner, from the standpoint of client device 107, client device 107 may receive instantaneous or otherwise low-latency processing of the requested blockchain operation, thus providing an improved and faster user experience for interacting with (e.g., performing operations on) blockchain 105.

In order to maintain the properties of blockchain 105 such as decentralization, immutability, security, etc., the requested (at 102) operation may also be performed by blockchain network 101 and the result may ultimately be recorded to blockchain 105. For example, as shown, LBPS 109 may output (at 108) a request to perform the operation on blockchain 105. The operation specified in this request (at 108) may be the same operation specified in the request (at 102) from client device 107. LBPS 109 may, for example, output (at 108) the request to blockchain network 101 at the same time as (e.g., in parallel with, simultaneously with, or otherwise contemporaneously with) performing (at 104) the requested operation and/or providing (at 106) the result to client device 107.

Blockchain network 101 (e.g., some or all nodes 103 of blockchain network 101) may perform (at 110) the requested operation, which may include executing chaincode that has been recorded to blockchain 105, recording information (e.g., a result of executing such chaincode) to blockchain 105, or other suitable operations. As discussed above, performing (at 110) the operation and recording the result may include implementing a consensus mechanism between nodes 103 of blockchain network 101. Blockchain network 101 (e.g., one or more particular nodes 103 of blockchain network 101) may output (at 112), to LBPS 109, a response to the request (at 108). The response may include, for example, confirmation that the operation has been performed by blockchain network 101 and that the result has been recorded to blockchain 105 (e.g., a new block has been added to blockchain 105 with the result). The confirmation may further include a result hash generated by blockchain network 101, and/or LBPS 109 may generate a result hash based on the confirmation provided by blockchain network 101. If the result hash of the operation performed (at 110) by blockchain network 101 matches the result hash of the operation performed (at 104) by LBPS 109, this may indicate that LBPS 109 generated the same result as generated by blockchain network 101, and that the result generated (at 104) by LBPS 109 is therefore valid. LBPS 109 may accordingly, in some embodiments, notify (at 114) client device 107 that the result that was previously provided (at 105) by LBPS 109 has been confirmed and/or validated by blockchain network 101, and/or that such result has been recorded to blockchain 105. In this manner, client device 107 may be able to verify that the result that was provided (at 106) relatively quickly to client device 107 features the security, decentralization, and immutability afforded by blockchain 105. For example, as discussed below, LBPS 109 may compare the result provided (at 112) by blockchain network 101 to the result generated (at 104) by LBPS 109, and may indicate (at 114) whether the results match. Additionally, or alternatively, LBPS 109 may provide (at 114) the result provided by blockchain network 101, and client device 107 may compare the results (provided at 106 and 114) to determine whether such results match.

As such, in accordance with some embodiments, the operation may be performed with such features afforded by blockchain techniques, with the added feature of fast, low-latency processing.

Figure 2:
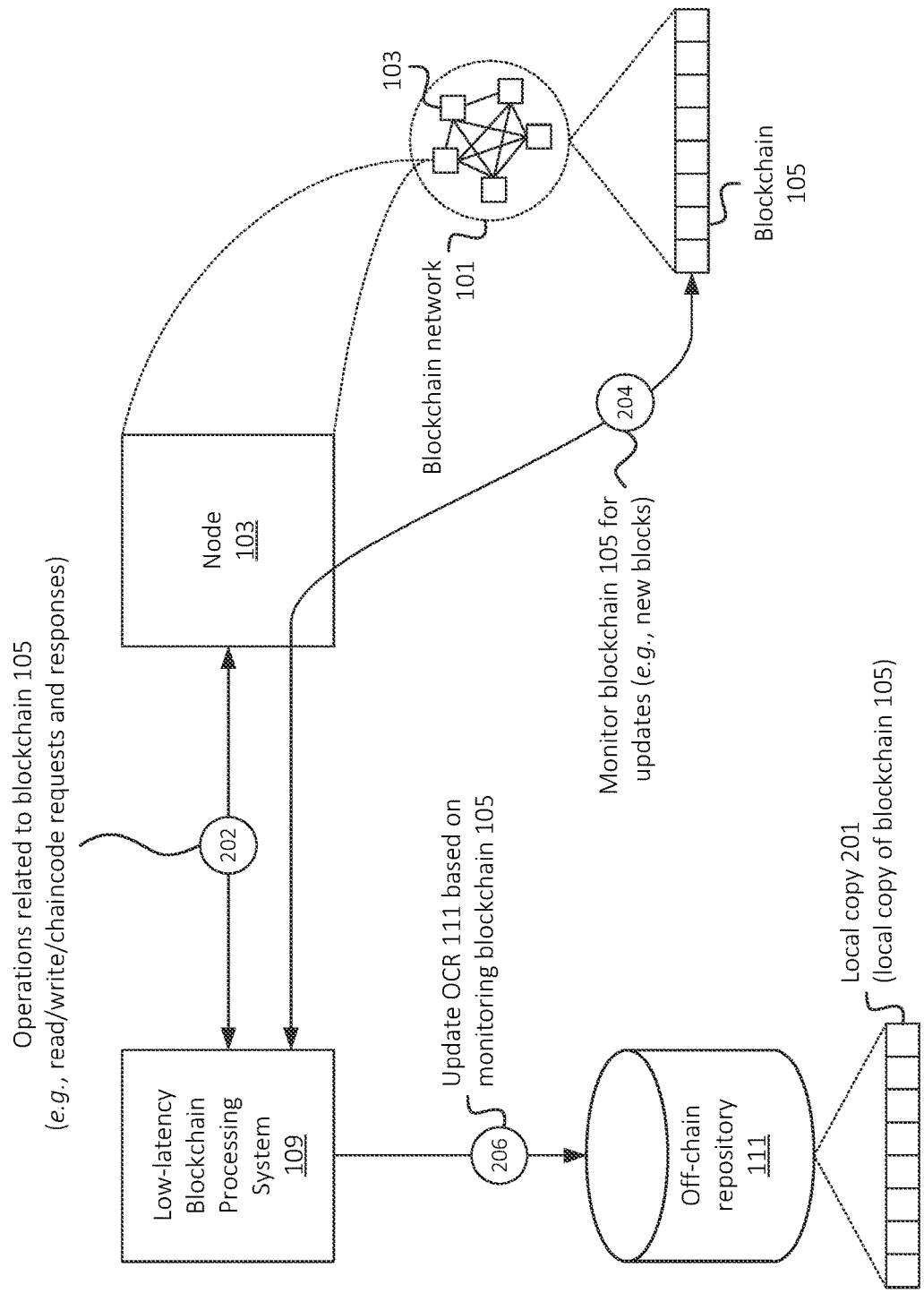
FIG. 2 illustrates an example of monitoring a blockchain and maintaining a local copy of the blockchain, in accordance with some embodiments.

FIGS. 2-5B provide additional details with respect to some of the operations described above with respect to FIG. 1. As shown in FIG. 2 and as noted above, LBPS 109 may communicate (at 202) with one or more nodes 103 of blockchain network 101 in order to perform operations related to blockchain 105. For example, LBPS 109 may access blockchain 105 via node 103, such as requesting the performance of chaincode, requesting the recordation of data to blockchain 105, requesting read access to blockchain 105, etc. As noted above, (e.g., in instances where LBPS 109 and node 103 are implemented by the same device or system and/or in other implementations), LBPS 109 and node 103 may communicate (at 202) via an API or some other suitable communication pathway.

In some embodiments, LBPS 109 may monitor (at 204) blockchain 105 for updates, such as new blocks recorded to blockchain 105. LBPS 109 may, for example, access blockchain 105 via node 103 periodically (e.g., every second, every minute, every hour, etc.), intermittently, and/or on some other suitable basis. In some embodiments, node 103 may be configured to "push" updates to LBPS 109, such that LBPS 109 receives new blocks when such blocks are recorded to blockchain 105. LBPS 109 may update (at 206) the local copy 201 of blockchain 105 (e.g., as maintained in OCR 111) to reflect the latest updates to blockchain 105.

Figure 3:
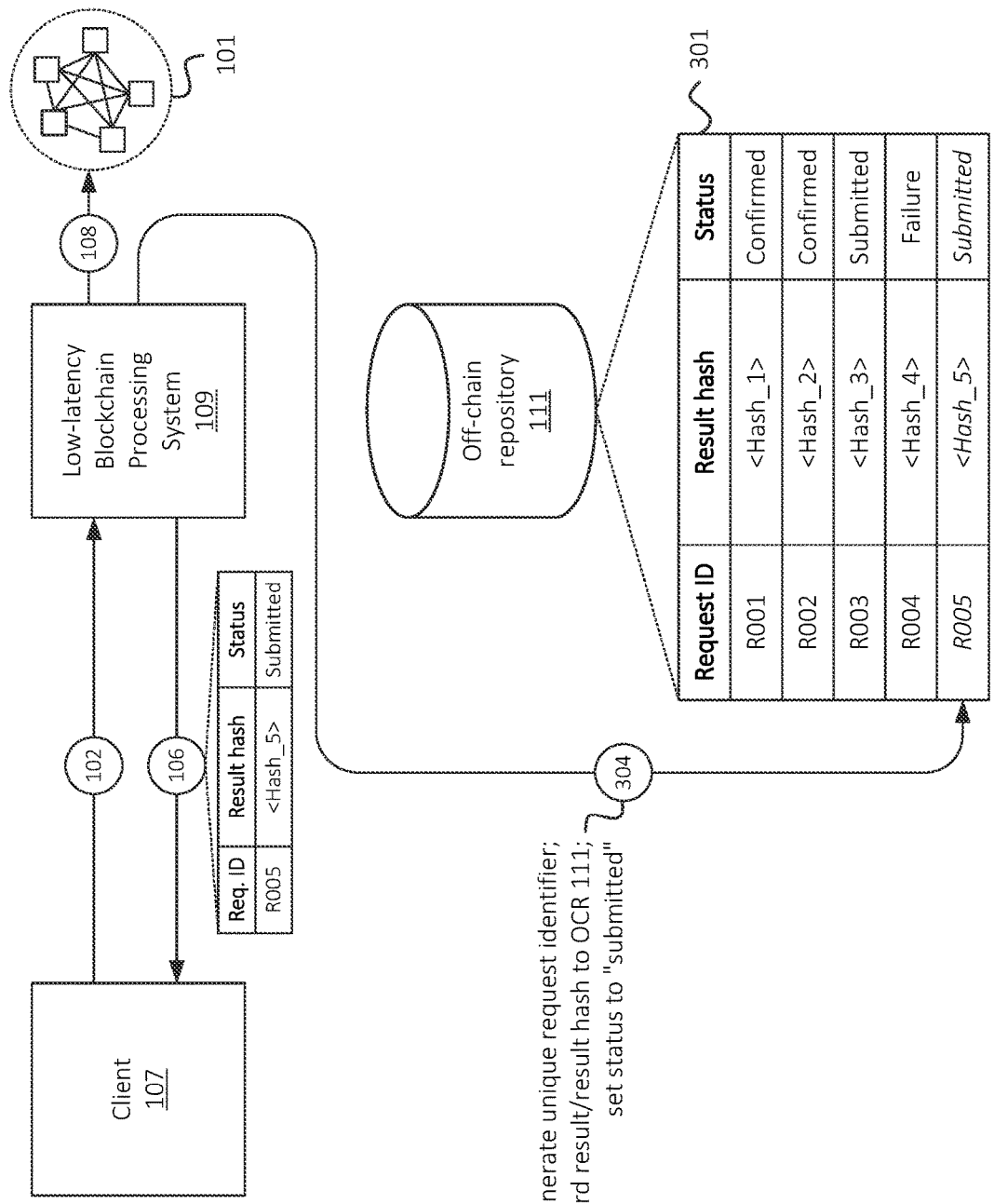
FIG. 3 illustrates an example of a low-latency performance of a requested blockchain operation, in accordance with some embodiments.
Figure 4A:
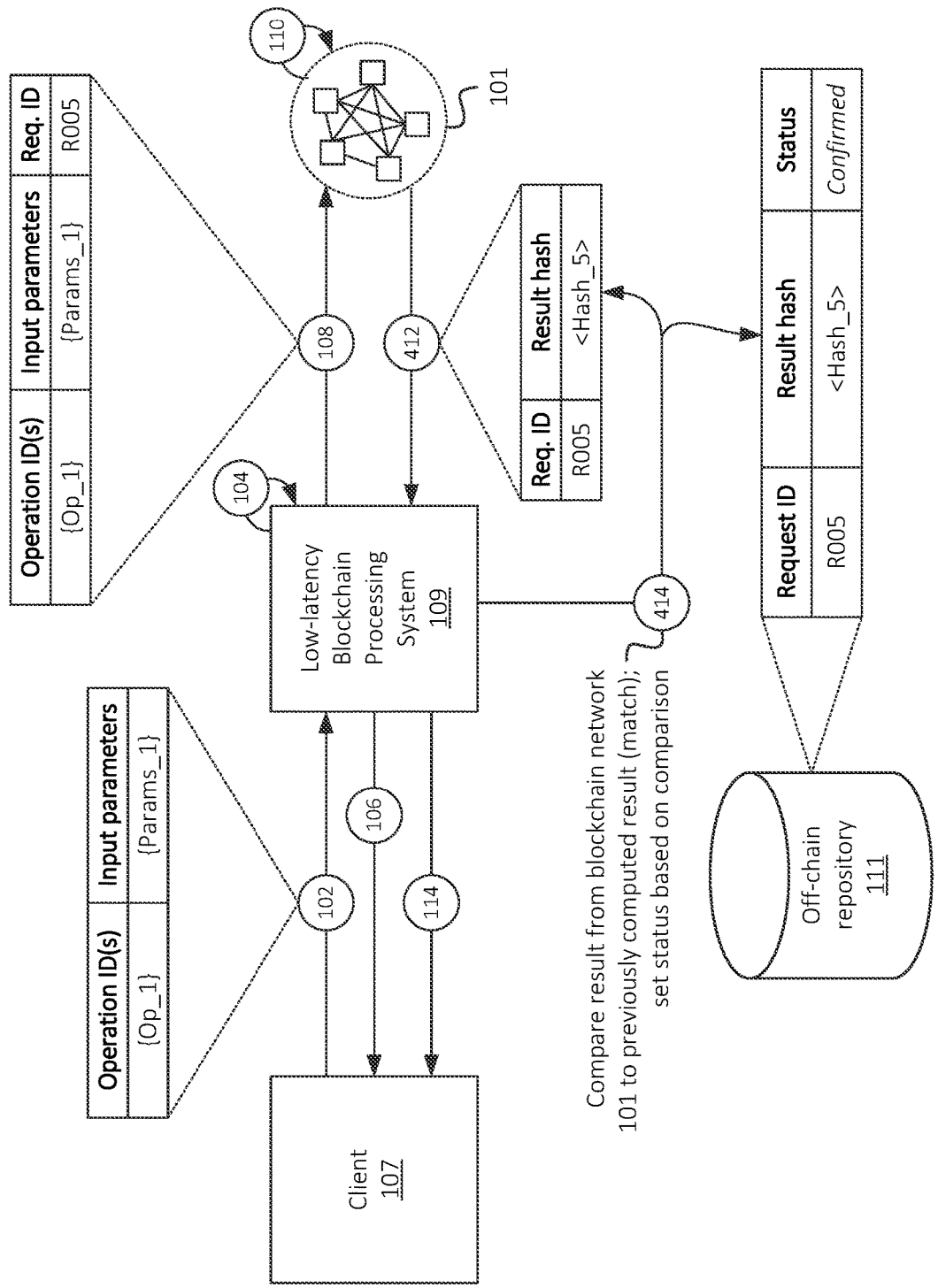
FIG. 4A illustrates an example of confirming the result of performing a low-latency blockchain operation, in accordance with some embodiments.

As shown in FIG. 4A, LBPS 109 may maintain information regarding requests to perform blockchain operations, such as requests received (e.g., at 102) from client device 107 and/or from other sources. As discussed below, such information may be used to confirm that low-latency results provided by LBPS 109 have been ultimately verified, confirmed, reproduced, etc. by blockchain network 101. As shown, for example, LBPS 109 may maintain (e.g., in OCR 111) data structure 301, which includes information regarding blockchain operation requests received by LBPS 109 from client device 107 and/or one or more other sources. Each request may be associated with a unique identifier, referred to as a "request identifier" or "request ID." For example, when receiving (at 102) a request from client device 107 to perform one or more blockchain operations, LBPS 109 may identify, select, generate, etc. a unique request identifier associated with the request (shown in FIG. 3 as "R005"). LBPS 109 may maintain such request identifier in data structure 301 or in some other suitable manner.

After performing the requested blockchain operation(s), LBPS 109 may further store information associated with the generated result, such as the result hash, one or more output parameters, or other suitable information in data structure 301. In this example, the result hash associated with the request from client device 107 is represented as "<Hash_5>". LBPS 109 may also set a status of the request to "submitted" or some other suitable identifier or label. The "submitted" status may indicate that LBPS 109 has requested (at 108) the blockchain operation(s) to be performed by blockchain network 101, but that LBPS 109 has not yet received or verified a result of such blockchain operation(s). For example, during the period of time that elapses between LBPS 109 submitting (at 108) a request to blockchain network 101 to perform the blockchain operation(s) and LBPS 109 receiving the result of such operations from blockchain network 101, the status of the request may be "submitted."

As noted above, LBPS 109 may provide (at 106) the result hash or other information associated with the output of the requested operation (e.g., as performed by LBPS 109) to client device 107, before ultimately receiving a response to the request (at 108) from blockchain network 101. In some embodiments, providing (at 106) the information associated with the output of the requested operation may include providing the request identifier that was generated (at 304) by LBPS 109 and/or the status information. In this manner, client device 107 may be made aware that the provided (at 106) result has not yet been confirmed, validated, verified, etc. by blockchain network 101.

As shown in FIG. 4A, in some embodiments, LBPS 109 may use the request identifier when communicating with blockchain network 101, in order to associate results provided by blockchain network 101 with results generated by LBPS 109. For example, as similarly discussed above, the request (at 102) from client device 107 may specify one or more blockchain operations to perform (referred to as "{Op_1}") and a set of input parameters on which such operations should be performed (referred to as {"Params_1"}). As discussed above, specifying the blockchain operations and/or the set of input parameters may include referencing particular blocks of blockchain 105 that include chaincode, values, variables, or the like. As also noted above, when requesting (at 108) that blockchain network perform such blockchain operations, LBPS 109 may specify the blockchain operations and the input parameters in one or more requests provided to blockchain network 101 (e.g., to one or more nodes 103 of blockchain network 101). LBPS 109 may also, in some embodiments, provide the request identifier (e.g., as generated at 304) when communicating (at 108) with blockchain network 101. In some embodiments, the request identifier may be provided (at 108) as metadata or may otherwise be indicated as being separate from the requested operations and input parameters. For example, when performing (at 110) the requested operations, blockchain network 101 may perform such operations (e.g., {Op_1}) on the input parameters (e.g., {Params_1}), but may not utilize the request identifier (e.g., R005) as an input to such operations.

As similarly noted above, blockchain network 101 may provide one or more results, a result hash, etc. to LBPS 109 based on performing the requested blockchain operations. In this example, blockchain network 101 may provide a particular result hash that matches the result hash generated by LBPS 109 (e.g., <Hash_5>). The result hash may match in situations where LBPS 109 and blockchain network 101 have generated the same result, outputs, etc. by performing the blockchain operation(s) initially requested (at 102) by client device 107. Blockchain network 101 may also provide (at 412) the request identifier with the result, such that LBPS 109 is able to determine that the result hash provided by blockchain network 101 is associated with the operations requested (at 102) by client device 107.

In some embodiments, LBPS 109 may identify the result, result hash, etc. generated by blockchain network 101 in some other manner. In such embodiments, blockchain network 101 may forgo providing the request identifier when providing (at 412) the result to LBPS 109, and/or blockchain network 101 may forgo providing the result hash to LBPS 109 entirely. For example, in some embodiments, blockchain network 101 may record the request identifier to blockchain 105 with the result hash. For example, when recording such information to blockchain 105, blockchain network 101 may add one or more blocks to blockchain 105 that include information such as the request identifier, the result hash, a time and date at which blockchain network 101 recorded the one or more blocks to blockchain 105, and/or other suitable information. In such embodiments, LBPS 109 may access (e.g., read, monitor, etc.) blockchain 105 to identify the request identifier in one or more blocks, records, etc. of blockchain 105.

As another example, LBPS 109 may access (e.g., read, monitor, etc.) blockchain 105 to identify if any of the information recorded to blockchain 105 matches the result hash generated (e.g., at 104) by LBPS 109. That is, in some embodiments, LBPS 109 may use the result hash as a search key, query term, etc. to identify whether a matching result hash has been recorded to blockchain 105. In such embodiments, LBPS 109 may forgo providing (at 108) the request identifier to blockchain network 101.

LBPS 109 may compare (at 414) the result hash provided (at 412) by blockchain network 101 (and/or the result hash recorded to blockchain 105, as discussed above), and may identify whether such result hash matches the result hash generated (at 104) by LBPS 109. In this example, the result hashes match (i.e., as denoted by both result hashes being <Hash_5>). Based on determining that blockchain network 101 has generated the same result (e.g., the same result hash) of the operation initially requested (at 102) by client device 107, LBPS 109 may set (at 414) the status of the request to "confirmed" or some other suitable status. Specifically, LBPS 109 may change the status from a first status (e.g., "submitted" as shown in FIG. 3) to a different second status (e.g., "confirmed" as shown in FIG. 4A) based on determining that the result generated (at 104) by LBPS 109 is the same as the result generated (at 110) by blockchain network 101.

Figure 4B:
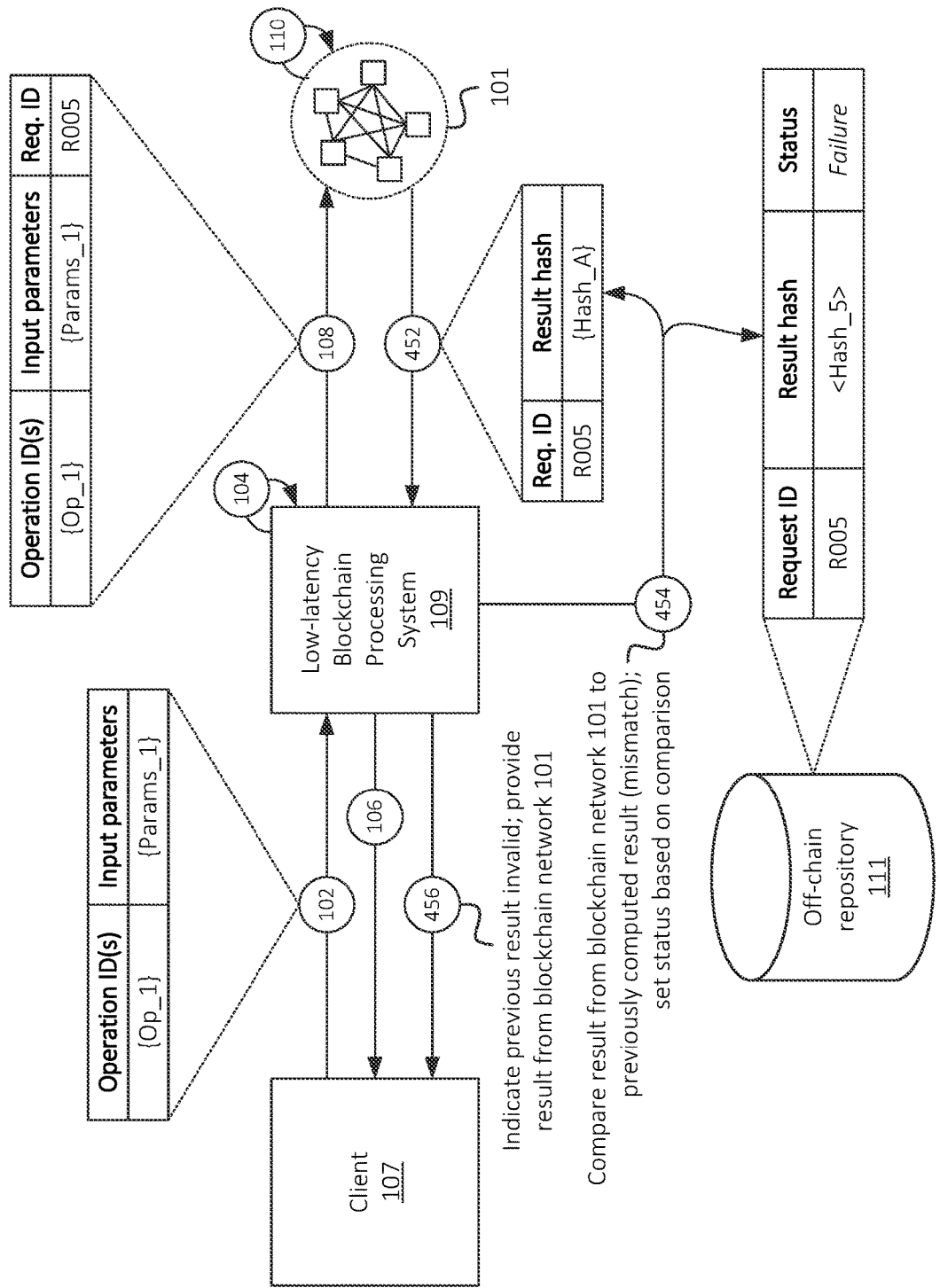
FIG. 4B illustrates an example of indicating an invalid result of performing a low-latency blockchain operation, in accordance with some embodiments.

In some scenarios, the result generated (at 104) by LBPS 109 may be different from the result generated (at 110) by blockchain network 101. For example, if the local copy 201 of blockchain 105, as maintained by LBPS 109 (e.g., in OCR 111) is out of date, out of sync, corrupted, or otherwise different from blockchain 105 as maintained by blockchain network 101, the result generated (at 104) may be different from the result generated (at 110) by blockchain network 101. For example, as shown in FIG. 4B, the result generated (at 110) by blockchain network may include a result hash of "<Hash_A>." LBPS 109 may receive (at 452) such result hash, and may identify (at 454) that the result hash provided by blockchain network 101 is different from the result hash generated (at 104) by LBPS 109 (e.g., a comparison of <Hash_A> to <Hash_5> may reveal that these result hashes are different). LBPS 109 may accordingly set the status of the corresponding request to "failure" or some other suitable identifier that indicates that LBPS 109 previously generated an incorrect or invalid result.

In some embodiments, LBPS 109 may indicate (at 456) that the result provided (at 106) by LBPS 109 to client device 107 is invalid or otherwise does not match the result generated by blockchain network 101 for the blockchain operations requested (at 102) by client device 107. In some embodiments, this indication may include the request identifier (i.e., R005 in this example), such that client device 107 is able to identify which request is associated with the previously provided (at 106) invalid result. In some embodiments, LBPS 109 may further provide (at 456) the result hash, generated by blockchain network 101, to client device 107. Additionally, or alternatively, LBPS 109 may provide a reference (e.g., a block address of blockchain 105 or other suitable information) to client device 107, based on which client device 107 may identify the valid result by accessing blockchain 105. In this manner, client device 107 may be able to identify and remediate any potentially invalid results provided (at 106) by LBPS 109, thus adding an element of robustness to the techniques described herein.

Figure 5A:
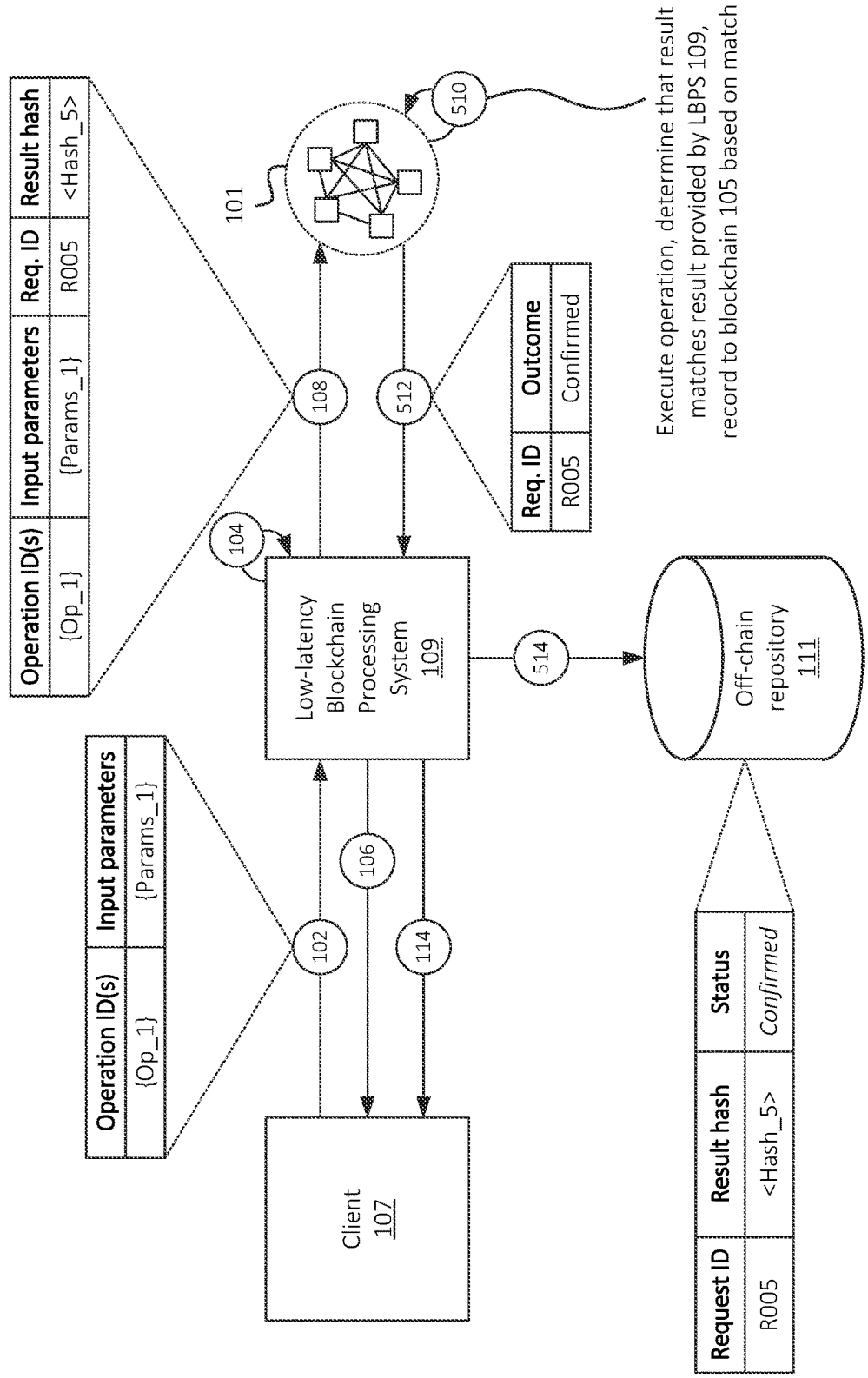
FIG. 5A illustrates an example of confirming the result of performing a low-latency blockchain operation, in accordance with some embodiments.
Figure 5B:
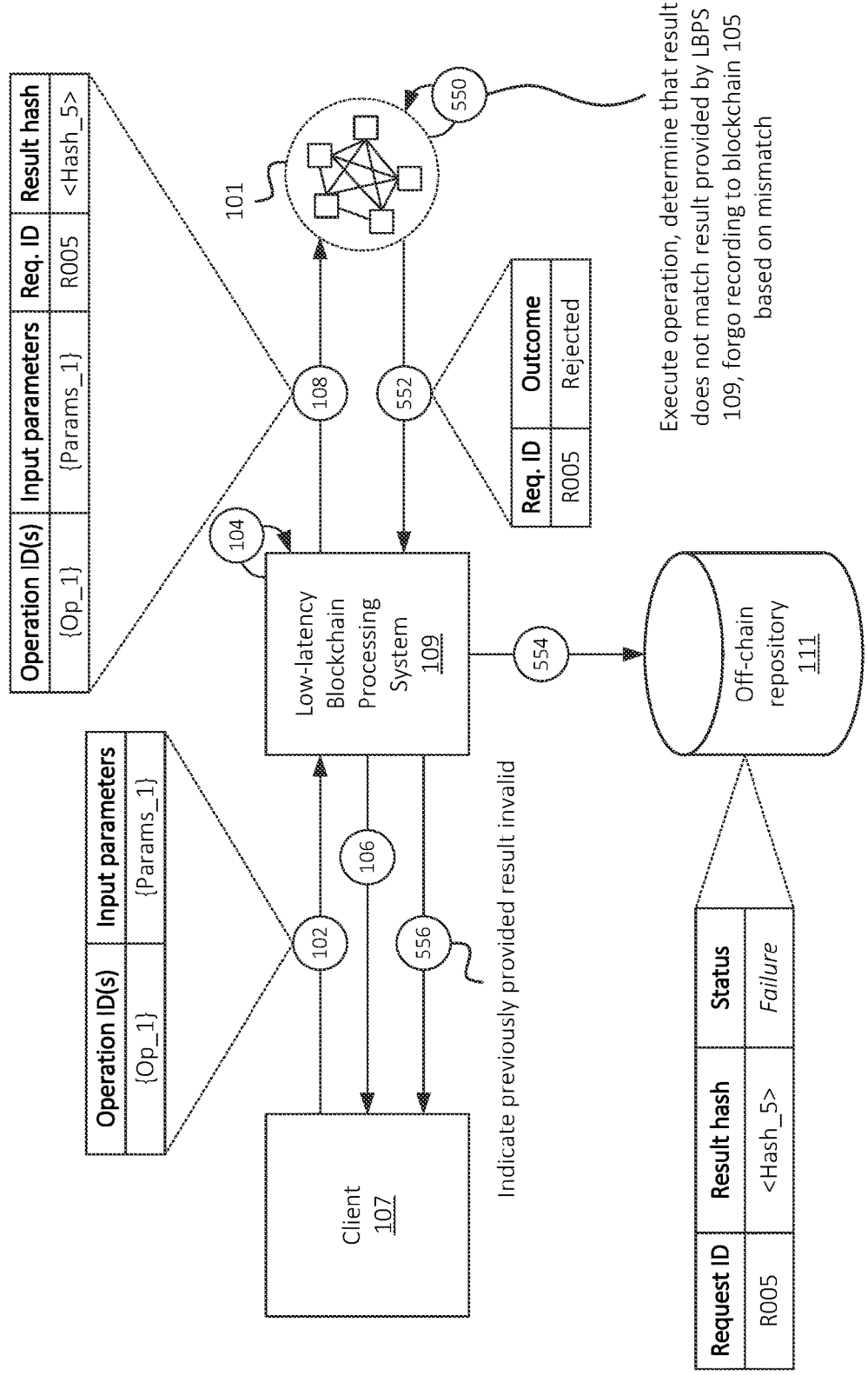
FIG. 5B illustrates an example of indicating an invalid result of performing a low-latency blockchain operation, in accordance with some embodiments.

In some embodiments, as shown in FIGS. 5A and 5B, blockchain network 101 may selectively record (or not record) results of a requested operation to blockchain 105, based on whether the result of the operation generated by LBPS 109 is valid (e.g., matches a result generated by blockchain network 101). For example, as shown in FIG. 5A, when outputting (at 108) a request to blockchain network 101 to perform a blockchain operation initially requested (at 102) by client device 107, LBPS 109 may include the result, result hash, etc. generated (e.g., at 104) by LBPS 109 (i.e., <Hash_5>, in this example). One or more nodes 103 of blockchain network 101 may perform (at 510) the requested blockchain operation, and may compare a result of performing the blockchain operation (e.g., as generated by one or more nodes 103 of blockchain network 101) to the result provide (at 108) by LBPS 109. In this example, such nodes 103 of blockchain network 101 may identify that the result generated by nodes 103 match the result provided by LBPS 109. Accordingly, blockchain network 101 may record such result to blockchain 105, and may notify (at 512) LBPS 109 that the requested operation has been confirmed by blockchain network 101. The indication of the confirmation may be based on, for example, a recordation of the result (e.g., including <Hash_5> and/or some other values generated based on performing the blockchain operation) to blockchain 105. In some embodiments, the notification (at 512) may include the request identifier (i.e., R005, in this example), based on which LBPS 109 may identify with which particular request the notification is associated. LBPS 109 may accordingly set (at 514) a status of the request to confirmed, as similarly noted above, and may further notify (at 114) client device 107 that the result previously provided (at 106) has been confirmed, validated, etc. by blockchain network 101.

On the other hand, as shown in FIG. 5B, situations may arise in which the result generated by blockchain network 101 does not match the result generated by LBPS 109. For example, blockchain network 101 may perform (at 550) the operation requested (at 108) by LBPS 109, and may determine that the result of performing such operation does not match a result provided (at 108) by LBPS 109. As noted above, such a scenario may occur when a local copy 201 of blockchain 105, used by LBPS 109 to generate the result, is not synchronized with blockchain 105 as maintained by blockchain network 101 or in other scenarios. In some embodiments, blockchain network 101 may compare the result generated by blockchain network 101 to the result provided by LBPS 109, and determine that the results do not match. Based on the mismatch, blockchain network 101 may forgo recording the result to blockchain 105, and/or may otherwise reject the requested operation. Blockchain network 101 may notify (at 552) LBPS 109 that the operation was rejected by blockchain network 101 (e.g., based on the mismatch in the results), and LBPS 109 may update (at 554) a status of the request to "failure" or some other suitable status indicating that the result provided (at 106) to client device 107 has not been validated, confirmed, etc. by blockchain network 101. LBPS 109 may further indicate (at 556) to client device 107 that such previously provided result is invalid.

Figure 6:
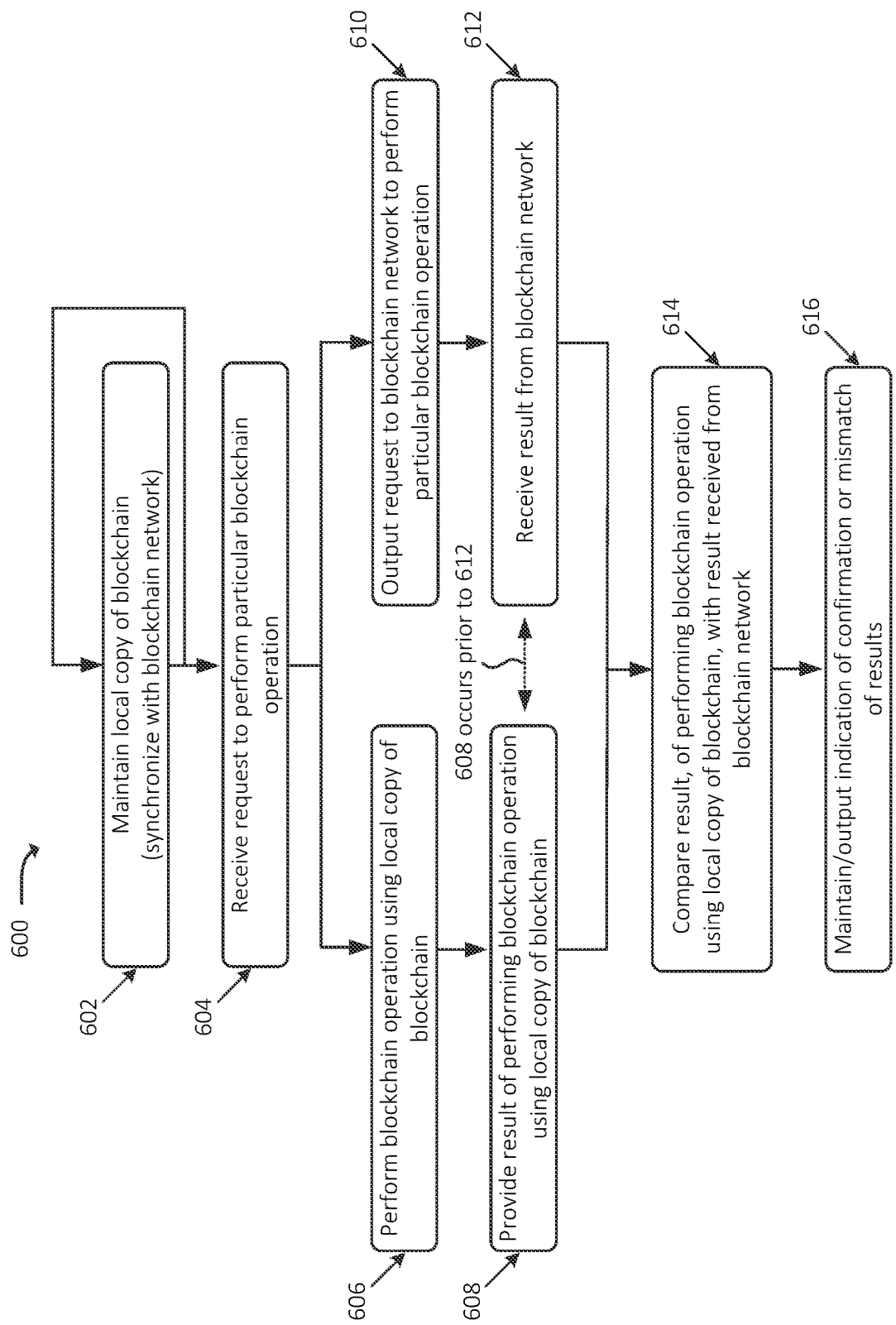
FIG. 6 illustrates an example process for performing and confirming a low-latency blockchain operation, in accordance with some embodiments.

FIG. 6 illustrates an example process 600 for performing and confirming a low-latency blockchain operation. In some embodiments, some or all of process 600 may be performed by LBPS 109. In some embodiments, one or more other devices may perform some or all of process 600 in concert with, and/or in lieu of, LBPS 109.

As shown, process 600 may include maintaining (at 602) a local copy of a blockchain. For example, as discussed above with respect to FIG. 2, LBPS 109 may monitor blockchain 105 by communicating with one or more nodes 103 of a particular blockchain network 101 with which blockchain 105 is associated, and/or may otherwise maintain an updated local copy of blockchain 105. LBPS 109 may maintain (e.g., in OCR 111) a local copy 201 of blockchain 105, and/or information derived therefrom (e.g., a world state database or other type of data structure).

Process 600 may further include receiving (at 604) a request (e.g., a first request) to perform a particular blockchain operation. For example, LBPS 109 may receive a request from client device 107 to execute particular chaincode (e.g., chaincode that is recorded to blockchain 105), write new information to blockchain 105, or the like.

Process 600 may additionally include performing (at 606) the blockchain operation using the local copy of blockchain 105. For example, as discussed above, LBPS 109 may execute chaincode using values or information recorded to local copy 201 of blockchain 105, write one or more new blocks to local copy 201 of blockchain 105, or the like. As discussed above, LBPS 109 may maintain information indicating that this blockchain operation has not yet been confirmed or validated by blockchain network 101 (e.g., may maintain information indicating that this operation is "pending," "submitted," "not yet validated," etc.). In some embodiments, performing the blockchain operation may include generating or determining a result, which may include one or more values, parameters, outputs, etc. that are generated or determined as a result of performing the blockchain operation. In some embodiments, the result may include, or may be associated with, a result hash or other type of value that is generated based on performing a cryptographic hashing operation on information associated with the result (e.g., the one or more values that result from performing the blockchain operation, an identifier of the blockchain operation itself, etc.). In some embodiments, performing the blockchain operation on local copy 201 of blockchain 105 may include forgoing participating (e.g., not participating) in a consensus mechanism with one or more other devices or systems.

Process 600 may also include providing (at 608) the result of performing the blockchain operation, using local copy 201 of blockchain 105, in response to the request (at 604) to perform the particular blockchain operation. For example, LBPS 109 may output the result, the result hash, etc. to client device 107. Additionally, or alternatively, client device 107 may "pull" the information associated with the result from LBPS 109, such as querying or requesting such information. In some embodiments, LBPS 109 may indicate that the provided (at 608) result is "pending" or otherwise has not yet been confirmed, validated, etc. by blockchain network 101.

Process 600 may further include outputting (at 610) a request to blockchain network 101 to perform the particular blockchain operation. In some embodiments, LBPS 109 may output (at 610) such request contemporaneously, asynchronously, simultaneously, in parallel, and/or otherwise independently with respect to performing (at 606) the blockchain operation using local copy 201 of blockchain 105. Blockchain network 101 may perform the blockchain operation with respect to blockchain 105, as maintained by one or more nodes 103 of blockchain network 101. In some embodiments, performing the blockchain operation by blockchain network 101 may include nodes 103 participating in a consensus mechanism prior to recording a result of the blockchain operation to blockchain 105.

Process 600 may additionally include receiving (at 612) a result (e.g., a second result) from blockchain network 101, based on blockchain network 101 performing the blockchain operation with respect to blockchain 105. In some embodiments, the second result may be received (at 612) at some time after the first result is provided (at 608) in response to the request (at 604). In this manner, an original requestor of the blockchain operation (e.g., client device 107) may receive the first result faster than the second result is generated.

Process 600 may also include comparing (at 614) the result of performing the blockchain operation, using local copy 201 of blockchain 105 (e.g., the first result), to the result of blockchain network 101 performing the blockchain operation including participating in a consensus mechanism (e.g., the second result). For example, LBPS 109 may determine whether the first result and/or associated information (e.g., a first result hash based on the first result) matches the second result and/or associated information (e.g., a second result hash based on the second result).

Process 600 may further include maintaining and/or outputting (at 616) an indication of confirmation or mismatch of the first and second results. For example, LBPS 109 may notify client device 107 in situations where the first and second results match, in situations where the first and second results do not match, or both. In this manner, client device 107 may be able to receive low-latency performance of blockchain operations, while also receiving the decentralization, immutability, and security afforded by the blockchain techniques implemented by blockchain network 101.

As noted above, in some embodiments, blockchain network 101 may compare the result generated by blockchain network 101 to the result generated (at 606) by LBPS 109. For example, in some embodiments, the request (at 610) may include the result generated by LBPS 109, and blockchain network 101 may indicate to LBPS 109 whether the results match or not (e.g., whether blockchain network 101 has recorded such result to blockchain 105 or has forgone recording such result to blockchain 105).

Figure 7A:
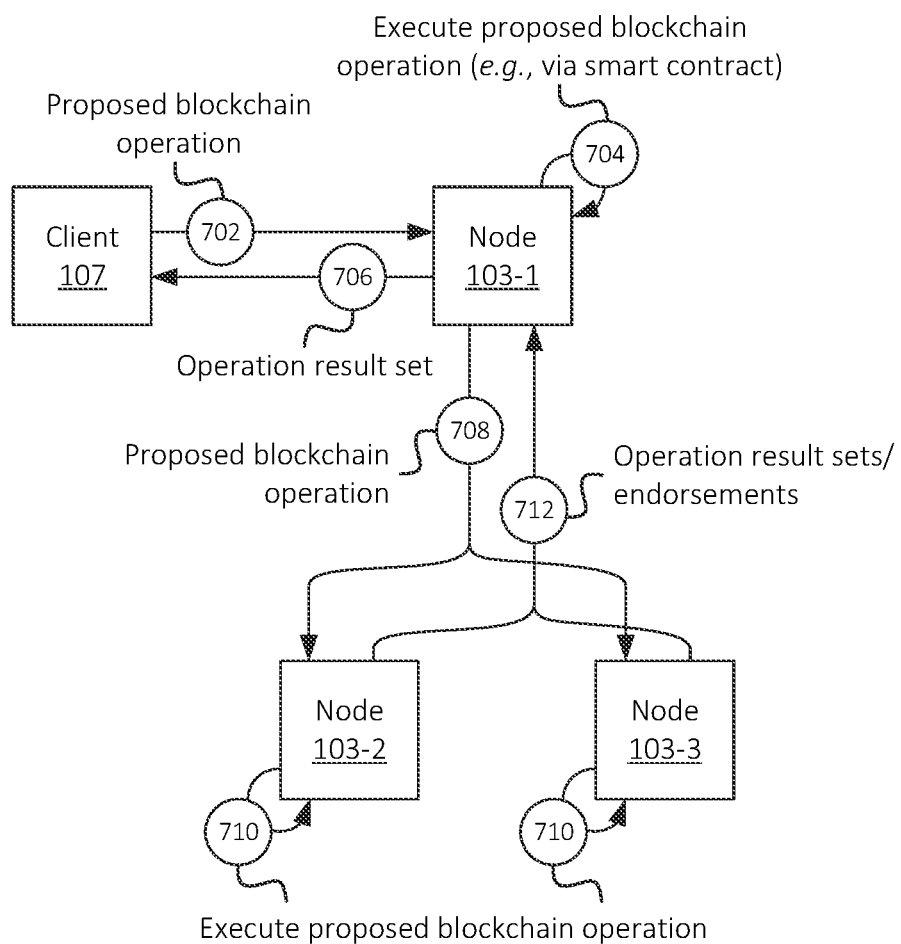
FIGS. 7A and 7B illustrate example operations associated with recording information to a blockchain, in accordance with some embodiments.
Figure 7B:
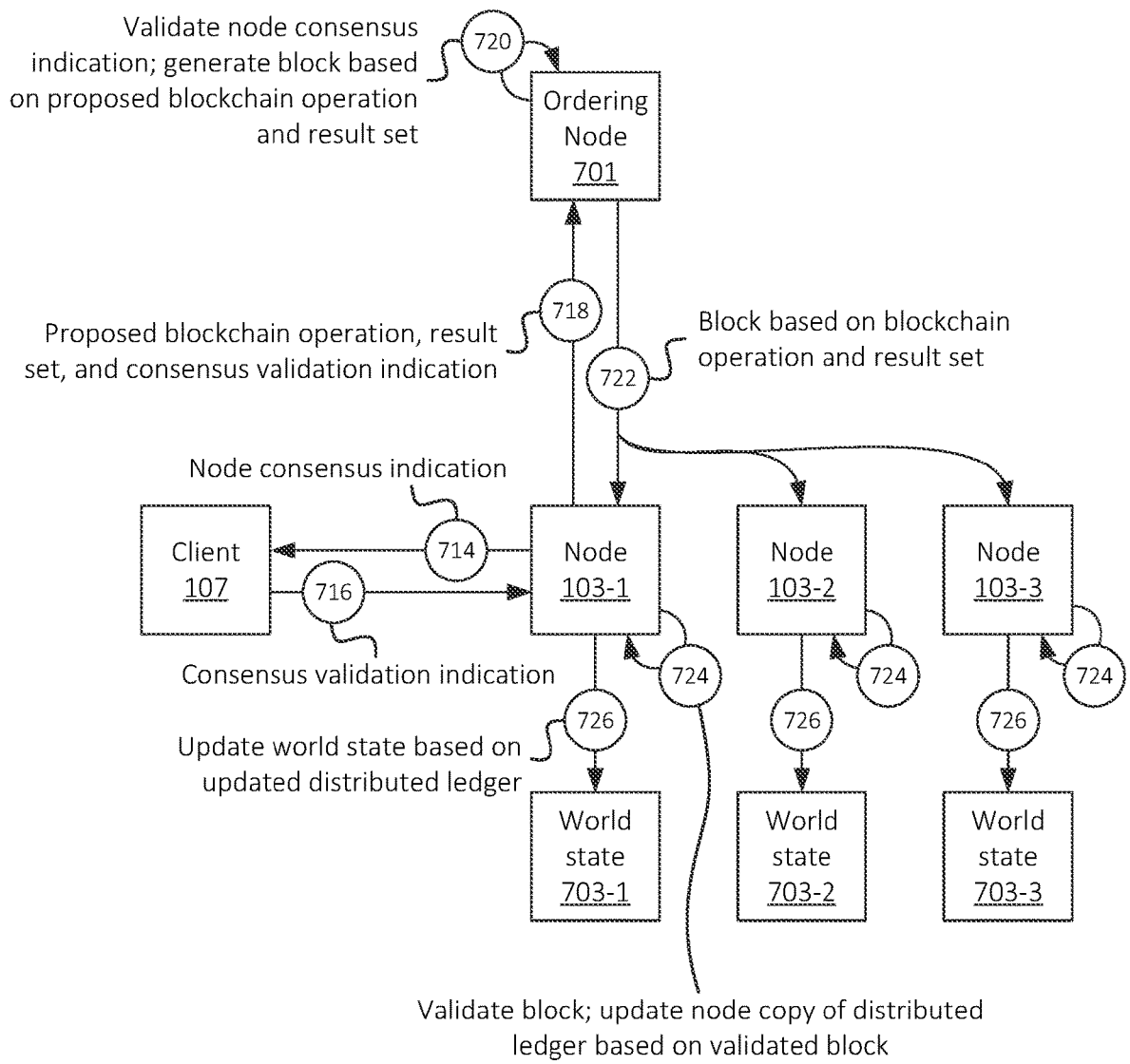

FIGS. 7A and 7B illustrate an example of modifying blockchain 105 and/or world state information based on an interaction with blockchain 105 (e.g., a request to perform one or more blockchain operations). As shown, a particular node 103-1 may receive (at 702) a proposed blockchain operation (e.g., a request to access or record information to blockchain 105) from a particular source, such as client device 107, LBPS 109, and/or some other suitable device or system (e.g., which may be or may be implemented by a device or system that has access to node 103-1, such as a device or system that has authentication credentials, locator information, etc. via which client device 107 is able to interact with node 103-1). In some embodiments, node 103-1 may receive the proposed blockchain operation from a blockchain management system (e.g., which may receive the proposed blockchain operation from client device 107 and may select node 103-1 out of a group of nodes 103, such as a group of nodes associated with the same channel in a channel-based blockchain system, such as the Hyperledger® Fabric), an ordering node, or other suitable device or system.

Client device 107 may be, for example, an entity associated with blockchain 105 (e.g., may be associated with an address, a "wallet," a decentralized application ("dApp"), etc.). In this example, assume that client device 107 is authorized to initiate, request, etc. the proposed blockchain operation, which may include the modification of one or more values of one or more attributes that are currently associated with blockchain 105, the addition of one or more attributes to blockchain 105, or other suitable interactions. In other examples, node 103-1 and/or some other device or system may verify that client device 107 is authorized to initiate the proposed blockchain operation.

In some embodiments, the proposed blockchain operation (received at 702) may indicate or refer to chaincode recorded to blockchain 105, which may specify one or more inputs (e.g., types of inputs, quantity of inputs, and/or other input parameters), and may also include actions to take with respect to the inputs in order to generate one or more outputs (e.g., chaincode). For example, the proposed blockchain operation may specify particular chaincode (e.g., an address or reference associated with blockchain 105 that includes a record with which the chaincode is associated) and one or more input values according to input parameters specified by the particular chaincode. In some examples, the proposed blockchain operation may refer to one or more values that have previously been recorded to blockchain 105 (and thus reflected in world state information associated with blockchain 105), such as an interaction that increments or decrements previously recorded values or performs other computations based on previously recorded values.

Node 103-1 may execute (at 704) the proposed blockchain operation, which may include accessing the one or more values that were previously recorded to blockchain 105. In order to determine the one or more values referred to in the proposed blockchain operation, node 103-1 may access world state information, maintained by node 103-1, to determine such values. Such access may include checking a local cache and/or accessing, via a network, a remote system (e.g., a "cloud" system, a containerized system, etc.) associated with node 103-1 that maintains the world state associated with blockchain 105. The execution (at 704) may be a "simulation" of the proposed blockchain operation, inasmuch as the execution and of the proposed blockchain operation and the ensuing result may not yet be recorded to blockchain 105. The interaction may become "final" or "committed" based on validation by one or more other nodes. The result may include a "read-write set," which may include the values of the one or more attributes that were accessed (e.g., the values based on which the interaction was performed), as well as the resulting values after execution of the proposed interaction.

Node 103-1 may provide (at 706) the result set (e.g., the read-write set) based on executing (at 704) the proposed interaction to client device 107. Client device 107 may maintain the result set to, for example, verify and/or to provide approval of the result set before the result set is committed to blockchain 105. Node 103-1 may also provide (at 708) the proposed blockchain operation to one or more other nodes 103 associated with blockchain 105, such as nodes 103-2 and 103-3. In some embodiments, node 103-1 may provide (at 708) the result set generated by node 103-1 to nodes 103-2 and 103-3. Nodes 103-1 through 103-3 may all be associated with the same channel, nodes 103-2 and 103-3 may be specified by the chaincode as validators, and/or nodes 103-2 and 103-3 may otherwise be identified by node 103-1 or an associated blockchain management system as nodes that should validate, endorse, etc. the execution and result of the proposed interaction.

As similarly discussed with respect to node 103-1, nodes 103-2 and 103-3 may execute (at 710), and/or simulate the execution of, the proposed interaction. Accordingly, nodes 103-2 and 103-3 may access one or more values that were previously recorded to blockchain 105 using world state information maintained by nodes 103-2 and 103-3. Nodes 103-2 and 103-3 may validate, verify, etc. the result set generated by node 103-1 by comparing the result set with respective result sets generated by nodes 103-2 and 103-3. Nodes 103-2 and 103-3 may respond (at 712) to node 103-1 with respective result sets generated by nodes 103-2 and 103-3, and/or may respond with an indication, endorsement, etc. (e.g., which may be respectively signed by nodes 103-2 and 103-3) that the result set generated by node 103-1 is valid. Once node 103-1 has received endorsements from at least a threshold quantity of other nodes (e.g., from nodes 103-2 and 103-3, in this example), node 103-1 may determine that a consensus has been reached with respect to the result set for the proposed interaction.

As shown in FIG. 7B, node 103-1 may accordingly provide (at 714), to client device 107, an indication that consensus for the result set (provided at 706) has been reached. In some embodiments, client device 107 may validate the consensus (e.g., by evaluating signatures of nodes 103-2 and 103-3) and/or may verify the result set (e.g., by itself executing the proposed interaction). Client device 107 may provide (at 716), to node 103-1, an indication that client device 107 has validated the consensus and/or has verified the result set. In some embodiments, the consensus validation indication may be signed by client device 107, thus securely authenticating the validation by client device 107.

Node 103-1 may provide (at 718) the result set, along with the consensus validation indication and the proposed blockchain operation, to ordering node 701. Ordering node 701 may be a node, associated with the same channel as nodes 103-1 through 103-3, that validates (at 720) the consensus validation indication (e.g., validates signatures associated with client device 107 and/or nodes 103-1 through 103-3) and generates a block, to be recorded to blockchain 105, that includes information regarding the blockchain operation. Such information may include an identifier of client device 107 (e.g., an address, wallet identifier, etc.), identifiers of nodes 103-1 through 103-3 that participated in generating and/or validating the result set based on the blockchain operation, chaincode inputs provided by client device 107, the consensus validation indication, one or more timestamps of the above operations and/or other events, and/or other suitable information associated with the blockchain operation. In some embodiments, the block may be signed by ordering node 701, thus securely authenticating the block creation by ordering node 701. At this point, the blockchain operation may no longer be a "proposed" blockchain operation, as the interaction has been finalized, committed, etc. by ordering node 701. In some implementations, nodes 103-1 through 103-3 may be referred to as "peers," to indicate that such nodes 103-1 through 103-3 are distinct from ordering node 701 (e.g., ordering node 701 performs one or more different operations from the peers).

Ordering node 701 may propagate (at 722) the signed block, including information regarding the finalized blockchain operation initiated by client device 107, to nodes 103-1 through 103-3 and/or other nodes associated with the same channel. Nodes 103-1 through 103-3 may validate (at 724) the block, which may include verifying the signature of ordering node 701, and may accordingly update a respective copy of blockchain 105 as maintained by each one of nodes 103-1 through 103-3. Nodes 103-1 through 103-3 may maintain respective independent copies of blockchain 105, thus providing an element of decentralization to blockchain 105. As such, when adding the block (received at 722), nodes 103-1 through 103-3 may continue to maintain separate copies of the same blockchain 105, including the information regarding the finalized blockchain operation.

Nodes 103-1 through 103-3 may also maintain respective world state information 703 (e.g., world state information 703-1, 703-2, and 703-3). For example, world state information 703 may include a portion of the information stored in blockchain 105, such as the latest version of some or all of the attributes for which information has been recorded to blockchain 105. Nodes 103-1 through 103-3 may accordingly update (at 726) respective copies of world state information 703 based on the received block. For example, in the event that the block includes a change in the value of a particular attribute, nodes 103-1 through 103-3 may update world state information 703-1 through 703-3, respectively, to replace a previous value of the attribute (e.g., a previous version of the attribute) with the newly received value of the particular attribute.

Figure 8:
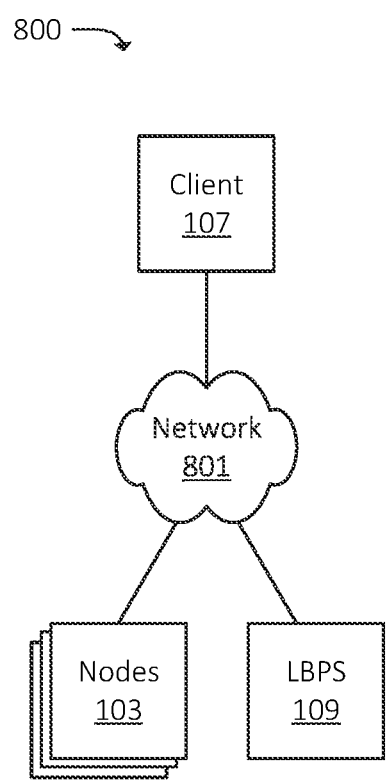
FIG. 8 illustrates an example environment in which one or more embodiments, described herein, may be implemented.

FIG. 8 illustrates an example environment 800, in which one or more embodiments may be implemented. Environment 800 may include network 801, LBPS 109, client device 107, and nodes 103. In some embodiments, environment 800 may include one or more additional devices or systems communicatively coupled to network 801 and/or one or more other networks.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. In some implementations, one or more devices of environment 800 may be physically integrated in, and/or may be physically attached to, one or more other devices of environment 800. Alternatively, or additionally, one or more of the devices of environment 800 may perform one or more network functions described as being performed by another one or more of the devices of environment 800. Elements of environment 800 may interconnect with each other and/or other devices via wired connections, wireless connections, or a combination of wired and wireless connections. Some or all of the elements of environment 800 may be implemented by one or more devices, sets of hardware resources, cloud systems, or the like.

Network 801 may include one or more wired and/or wireless networks. For example, network 801 may include an IP-based Packet Data Network ("PDN"), a wide area network ("WAN") such as the Internet, a private enterprise network, and/or one or more other networks. Client device 107, LBPS 109, nodes 103, and/or other devices or systems may communicate, through network 801, with each other and/or with other devices that are coupled to network 801. Network 801 may be connected to one or more other networks, such as a public switched telephone network ("PSTN"), a public land mobile network ("PLMN"), and/or another network. Network 801 may be connected to one or more devices, such as content providers, applications, web servers, and/or other devices, with which client device 107, LBPS 109, nodes 103, and/or other devices or systems may communicate.

Client device 107, LBPS 109, nodes 103, and/or other devices or systems may be implemented by one or more cloud systems, server devices, or other types of hardware resources. In some embodiments, client device 107, LBPS 109, and/or nodes 103 may be implemented by or communicatively coupled to a User Equipment ("UE"), which may include a computation and communication device, such as a wireless mobile communication device that is capable of communicating with network 801. The UE may communicate with network 801 via a wired or a wireless interface, such as via one or more radio access network ("RANs"), such as a Fifth Generation ("5G") RAN, a Long-Term Evolution ("LTE") RAN, etc. The UE may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, a wearable device, a Machine-to-Machine ("M2M") device, or the like), a Fixed Wireless Access ("FWA") device, or another type of mobile computation and communication device.

Figure 9:
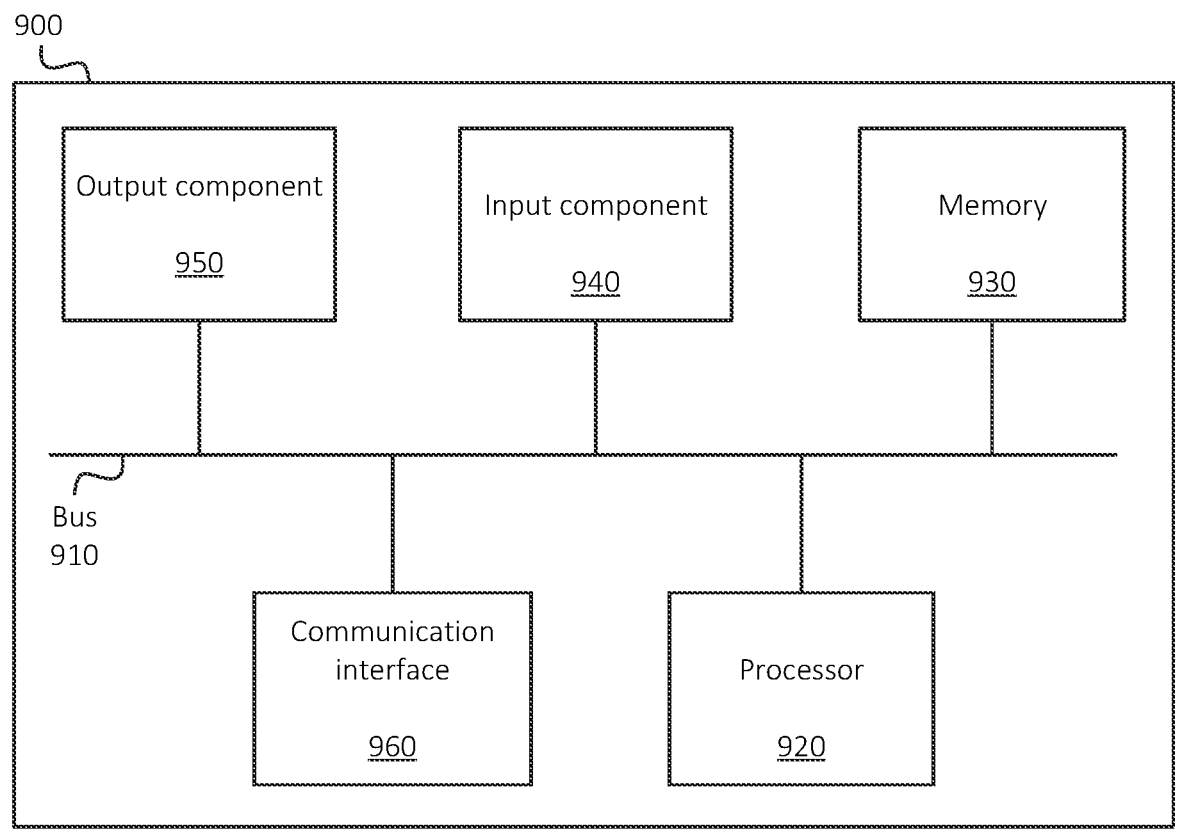
FIG. 9 illustrates example components of one or more devices, in accordance with one or more embodiments described herein.

FIG. 9 illustrates example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, a set of provisioned hardware resources of a cloud computing system, or other suitable type of hardware that interprets and/or executes instructions (e.g., processor-executable instructions). In some embodiments, processor 920 may be or may include one or more hardware processors. Memory 930 may include any type of dynamic storage device that may store information and instructions for execution by processor 920, and/or any type of non-volatile storage device that may store information for use by processor 920.

Input component 940 may include a mechanism that permits an operator to input information to device 900 and/or other receives or detects input from a source external to input component 940, such as a touchpad, a touchscreen, a keyboard, a keypad, a button, a switch, a microphone or other audio input component, etc. In some embodiments, input component 940 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems (e.g., via network 801). For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a cellular radio, a remote control, a wireless keyboard, a mobile telephone, etc. In some embodiments, device 900 may include more than one communication interface 960. For instance, device 900 may include an optical interface, a wireless interface, an Ethernet interface, and/or one or more other interfaces.

Device 900 may perform certain operations relating to one or more processes described above. Device 900 may perform these operations in response to processor 920 executing instructions, such as software instructions, processor-executable instructions, etc. stored in a computer-readable medium, such as memory 930. A computer-readable medium may be defined as a non-transitory memory device. A memory device may include space within a single physical memory device or spread across multiple physical memory devices. The instructions may be read into memory 930 from another computer-readable medium or from another device. The instructions stored in memory 930 may be processor-executable instructions that cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
    one or more processors configured to:
        maintain a local copy of a particular blockchain that is associated with a particular blockchain network;
        receive, from a particular client device, a first request to perform a particular blockchain operation with respect to the particular blockchain;
        perform, based on receiving the first request, the particular blockchain operation with respect to the local copy of the particular blockchain to generate a first result;
        maintain information indicating that the first result is associated with a first status;
        output, to the particular client device and in response to the first request, a first response that includes the first result and the first status;
        output a second request to the blockchain network to perform the particular blockchain operation with respect to the particular blockchain;
        receive a second result from the blockchain network in response to the second request, wherein the second result is generated by the blockchain network based on the blockchain network performing the particular blockchain operation with respect to the particular blockchain, wherein the second result is received from the blockchain network after outputting the first response to the first request;

determine that the second result matches the first result;
based on determining that the second result matches the first result, maintain information indicating that the particular blockchain operation is associated with a second status;
receive a third request associated with the particular blockchain operation; and
output, in response to the third request, a second response that includes the first result and the second status.

2. The device of claim 1, wherein the first result includes a first hash value generated based on a first output of performing the blockchain operation with respect to the local copy of the particular blockchain, and wherein the second result includes a second hash value generated based on a second output of the blockchain network performing the blockchain operation with respect to the particular blockchain.

3. The device of claim 1, wherein performing the requested blockchain operation includes executing particular chaincode that is included in the local copy of the particular blockchain.

4. The device of claim 1, wherein performing the requested blockchain operation based on the local copy of the particular blockchain includes performing the requested blockchain operation without participating in a consensus mechanism.

5. The device of claim 4, wherein the blockchain network participates in one or more consensus mechanisms when performing the particular blockchain operation with respect to the particular blockchain.

6. A non-transitory computer-readable medium, storing a plurality of processor-executable instructions to:
maintain a local copy of a particular blockchain that is associated with a particular blockchain network;
receive, from a particular client device, a first request to perform a particular blockchain operation with respect to the particular blockchain;
perform, based on receiving the first request, the particular blockchain operation with respect to the local copy of the particular blockchain to generate a first result;
maintain information indicating that the first result is associated with a first status;
output, to the particular client device and in response to the first request, a first response that includes the first result and the first status;
output a second request to the blockchain network to perform the particular blockchain operation with respect to the particular blockchain;
receive a second result from the blockchain network in response to the second request, wherein the second result is generated by the blockchain network based on the blockchain network performing the particular blockchain operation with respect to the particular blockchain, wherein the second result is received from the blockchain network after outputting the first result in response to the first request;
determine that the second result matches the first result;
based on determining that the second result matches the first result, maintain information indicating that the particular blockchain operation is associated with a second status;
receive a third request associated with the particular blockchain operation; and
output, in response to the third request, a second response that includes the first result and the second status.

7. The non-transitory computer-readable medium of claim 6, wherein the first result includes a first hash value generated based on a first output of performing the blockchain operation with respect to the local copy of the particular blockchain, and wherein the second result includes a second hash value generated based on a second output of the blockchain network performing the blockchain operation with respect to the particular blockchain.

8. The non-transitory computer-readable medium of claim 6, wherein performing the requested blockchain operation includes executing particular chaincode that is included in the local copy of the particular blockchain.

9. The non-transitory computer-readable medium of claim 6, wherein performing the requested blockchain operation based on the local copy of the particular blockchain includes performing the requested blockchain operation without participating in a consensus mechanism.

10. The non-transitory computer-readable medium of claim 9, wherein the blockchain network participates in one or more consensus mechanisms when performing the particular blockchain operation with respect to the particular blockchain.

11. A method, comprising:
maintaining a local copy of a particular blockchain that is associated with a particular blockchain network;
receiving, from a particular client device, a first request to perform a particular blockchain operation with respect to the particular blockchain;
performing, based on receiving the first request, the particular blockchain operation with respect to the local copy of the particular blockchain to generate a first result;
maintaining information indicating that the first result is associated with a first status;
outputting, to the particular client device and in response to the first request, a first response that includes the first result and the first status;
outputting a second request to the blockchain network to perform the particular blockchain operation with respect to the particular blockchain;
receiving a second result from the blockchain network in response to the second request, wherein the second result is generated by the blockchain network based on the blockchain network performing the particular blockchain operation with respect to the particular blockchain, wherein the second result is received from the blockchain network after outputting the first response to the first request;
determining that the second result matches the first result;
based on determining that the second result matches the first result, maintaining information indicating that the particular blockchain operation is associated with a second status;
receiving a third request associated with the particular blockchain operation; and
outputting, in response to the third request, a second response that includes the first result and the second status.

12. The method of claim 11, wherein the first result includes a first hash value generated based on a first output of performing the blockchain operation with respect to the local copy of the particular blockchain.

13. The method of claim 11, wherein performing the requested blockchain operation includes executing particular chaincode that is included in the local copy of the particular blockchain.

14. The method of claim 11, wherein performing the requested blockchain operation based on the local copy of the particular blockchain includes performing the requested blockchain operation without participating in a consensus mechanism, wherein the blockchain network participates in one or more consensus mechanisms when performing the particular blockchain operation with respect to the particular blockchain.

15. The method of claim 11, wherein the first status indicates that consensus has not been reached by the blockchain network with respect to the first result, and wherein the second status indicates that consensus has been reached by the blockchain network with respect to the second result.

16. The device of claim 1, wherein the first status indicates that consensus has not been reached by the blockchain network with respect to the first result, and wherein the second status indicates that consensus has been reached by the blockchain network with respect to the second result.

17. The non-transitory computer-readable medium of claim 6, wherein the first status indicates that consensus has not been reached by the blockchain network with respect to the first result, and wherein the second status indicates that consensus has been reached by the blockchain network with respect to the second result.

18. The non-transitory computer-readable medium of claim 7, wherein the second result includes a second hash value generated based on a second output of the blockchain network performing the blockchain operation with respect to the particular blockchain.

19. The device of claim 2, wherein the second result includes a second hash value generated based on a second output of the blockchain network performing the blockchain operation with respect to the particular blockchain.

20. The method of claim 12, wherein the second result includes a second hash value generated based on a second output of the blockchain network performing the blockchain operation with respect to the particular blockchain.

* * * * *